United States Patent Office 3,507,846

Patented Apr. 21, 1970

3,507,846

METHOD FOR THE POLYMERIZATION OF VINYL PYRIDINE MONOMERS

Howard C. Haas, Arlington, Mass., assignor to Polaroid Corporation, Cambridge, Mass., a corporation of Delaware No Drawing. Filed Apr. 12, 1967, Ser. No. 630,182
Int. Cl. C08f *1/11, 7/12*
U.S. Cl. 260—88.3 4 Claims

ABSTRACT OF THE DISCLOSURE

Vinyl pyridine monomers may be substantially completely polymerized in a system comprising a polyvinyl alcohol suspending agent and containing from 78% to 85% by weight of water and a catalyst which is sufficiently soluble in the water phase of said system to cause polymerization of substantially all of the monomer present therein.

This invention relates to the polymerization of monomers which are substantially water insoluble, and particularly to the polymerization of 2-vinyl pyridine and 4-vinyl pyridine.

In Patent No. 3,148,061, issued Sept. 8, 1964, the use of polyvinyl pyridine polymers in photographic receiving sheets designed for utilization in the well-known diffusion transfer process is disclosed, the polyvinyl pyridine comprising either the sole dyeable film-forming material in the image-receiving layer or being present in combination with other image-receptive materials. Particularly good results are obtained when the polyvinyl pyridine is used in conjunction with polyvinyl alcohol.

In a diffusion transfer photographic process utilizing an image-receiving sheet of the above description, a sheet of photosensitive material is exposed and then developed and concurrently with, or under control of, this development, an imagewise distribution of transferable color-providing materials is formed. At least a portion of these color-providing materials is transferred by means of an alkaline processing liquid to a superposed image-receiving layer to form a color image thereon. Such processes are disclosed in U.S. Patent No. 2,983,606, issued May 9, 1961, wherein dye developers (i.e., dyes containing a silver halide developing function and capable of developing exposed silver halides) are the color-providing materials; in U.S. Patent No. 2,647,049, issued July 28, 1953, wherein color developers are employed in combination with color couplers to provide the transfer color image; and in U.S. Patent No. 2,774,668, issued Dec. 18, 1956, wherein complete preformed dyes, which are capable of coupling, are used as the color-providing substance.

The image-receiving elements used in such processes generally comprise a transparent or opaque support coated with an image-receiving layer of a dyeable material which is permeable to aqueous alkaline solution.

The novel process of this invention comprises an improved method for preparing polyvinyl alcohol-polyvinyl pyridine compositions suitable for use in such diffusion transfer image-receiving elements.

Polymers of vinyl pyridines have been made by various methods including bulk, solution, and emulsion or suspension polymerization of the monomeric base. Those polymers produced by such methods are difficult to purify and contain occluded polymerization catalysts, emulsifying agents, unpolymerized monomers, etc. which are not easily removed.

In the past, such polymeric compositions were prepared primarily by polymerizing a vinyl pyridine monomer, and filtering, drying, grinding and storing the polyvinyl pyridine until needed; dissolving the polymer in aqueous acid solution and adding thereafter an aqueous polyvinyl alcohol solution. An image-receiving element is then prepared by coating a suitable support such as cellulose acetate, cellulose acetate coated baryta paper, etc. with the resulting mixture.

Polyvinyl alcohol is well known in the polymerization art as a suspending agent for, for example, vinyl acetate, but has always been used in very small quantities as, for example, about 1% by weight of the monomer. It has likewise also been found that the best image-receiving layers for use in the diffusion transfer process comprise two parts by weight of polyvinyl alcohol to one part poly-4-vinyl pyridine. Accordingly, it was proposed in Patent No. 3,208,964 to polymerize vinyl pyridines in the presence of polyvinyl alcohol and a peroxide catalyst as, for example, benzoyl peroxide; and to use the resultant polymeric mixture as the coating solution for forming an image-receiving layer. This polymerization produced an intimate, milky suspension of polyvinyl pyridine in polyvinyl alcohol, the particle size of the polyvinyl pyridine being very small. Prior to coating, the suspension was acidified as, for example, by the addition of a weak acid such as lactic, acetic, etc. in order to provide a coating solution. It was disclosed in the last-cited patent that 0.8 mole of acetic acid is sufficient to solubilize a mole of polyvinyl pyridine.

It has been discovered that when image-receiving sheets formulated with polyvinyl alcohol-poly-4-vinyl pyridine mixtures, as prepared by the method of the last-cited patent are aged for a relatively short time, changes occur in the image-receiving sheet which greatly affect the sensitometry of the entire system. It has unexpectedly been found that such changes are probably due to the presence of residual vinyl pyridine monomer in the image-receiving layer.

Accordingly it is a primary object of this invention to provide a novel process for the polymerization of generally water insoluble monomers, that is, vinyl pyridines, in the presence of polyvinyl alcohol wherein after the reaction has gone to completion there is substantially no residual vinyl pyridine remaining.

It is an additional object of the present invention to provide a solution of polyvinyl alcohol and polyvinyl pyridine which, when used in an image-receiving layer in the well-known diffusion photographic process, causes substantially no sensitometric changes in the system for an extended period of time.

Other objects of the invention will in part be obvious and will in part appear hereinafter.

This invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

The novel process of the present invention comprises polymerizing a vinyl pyridine monomer in the presence of polyvinyl alcohol, so that in the resultant product, substantially all of said monomer will have polymerized, that is, residual monomer concentration will be less than 0.1% by weight. As noted above, sensitometric problems were evident when the polyvinyl alcohol-polyvinyl pyridine solution prepared by the process of Patent No. 3,208,964 was utilized in an image-receiving sheet. That latter process comprises the polymerization of vinyl pyridines in a solution of polyvinyl alcohol wherein the ratio of polyvinyl alcohol to vinyl pyridine is approximately 2:1. It is also disclosed that peroxide catalysts, such as benzoyl peroxide, which is itself substantially water insoluble, is utilized to catalyze the reaction.

Although vinyl pyridines are substantially insoluble in water, it is recognized that some small amount will be dissolved in the aqueous phase of the polyvinyl alcohol-vinyl pyridine system. Since the peroxide catalyst is likewise substantially water insoluble, polymerization of the small amounts of vinyl pyridine monomer dissolved in the aqueous phase will not occur in a reasonable time since the rate of polymerization of a monomer is proportional to the concentration of the monomer in the polymerization system. It is evident that the more water that is present in such a system, the less likely will it be for the water-dissolved monomer to polymerize.

It has been found that if the ratio of polyvinyl alcohol to vinyl pyridine in the polymerization system is 2:1, which is ideal for use as an image-receiving sheet, and the amount of water utilized is held at a substantial minimum, mixtures of polyvinyl pyridines and polyvinyl alcohol can be produced with substantially no residual monomer. Empirically, the limits for the water content of such a polymerization solution have been found to be from 78% to 85% by weight of the system's constituents. When less than 78% is used the polyvinyl alcohol solution is too viscous. When more than 85% is used, traces of residual monomer are found in the resultant polyvinyl alcohol-polyvinyl pyridine mixture.

In addition to adjusting the water concentration in the polymerization mixture within the limits of 78% to 85% by weight, it is also considered critical to the present process, in order to reduce the possibility of having residual monomer, to use a catalyst which, as well as being soluble in the oil phase, i.e., the vinyl pyridine phase, is somewhat soluble in the aqueous phase, i.e., the catalyst will, to a limted degree, partition itself between the oil and water phases of the system. While any such catalyst, as, for example, acetyl peroxide, may be used, the preferred material is 2,2′-azobis[methylpropiontrile].

It is recognized that some graft polymerization, i.e., attachment of vinyl pyridine groups to the polyvinyl alcohol backbone, may occur. However, such a reaction is beneficial since it prevents phase separation between the polyvinyl pyridine and polyvinyl alcohol, which problem is discussed in copending application of Howard C. Haas, Ser. No. 630,191, filed Apr. 12, 1967.

Preferably, fully hydrolyzed polyvinyl alcohol is used in the novel process of this invention. However, if desired, a partially hydrolyzed grade of polyvinyl alcohol may be used satisfactorily.

When an image-receiving element is prepared utilizing the mixture prepared by the process of the present invention without using a polyvinyl pyridine solubilizing acid, a non-glassy mat surface results. However, when used in a photographic process as, for example, the process disclosed in U.S. Patent No. 2,983,606, an image of good quality is formed therein. Gloss may be imparted to the image surface by treatment with a stabilizing composition such as that claimed and described in U.S. Patent No. 3,239,338. The quality of the image thus produced is found to be excellent. The following example is illustrative of the process of the present invention and should not be construed in a limiting sense.

A coating composition for utilization as the image-receiving layer of a diffusion transfer receiving sheet was prepared as follows: In a three neck round bottom flask fitted with a stirrer, condenser, nitrogen inlet, thermometer, and heat bath, 75 gms. of polyvinyl alcohol is dissolved in 500 ml. of water under nitrogen. The solution is cooled to 60° F. and 1 gm. of 2,2′-azobis[methyl propiontrile] is dissolved in a solution of 37½ gms. of 4-vinyl pyridine (freshly distilled, B.P. 59°, at 12 mm.). With as vigorous stirring as possible the 4-vinyl pyridine solution is added in a steady stream to the vessel containing the polyvinyl alcohol solution. The solution is kept at 60° F. for about 3½ hours, after which the temperature is raised to about 90° F. for a half hour. The solution is subsequently cooled, 15.4 gms. of lactic acid is added, and the solution is diluted to 7% by weight of total solids with water. A coating composition prepared in this manner may be cast onto an appropriate support and allowed to dry. Repeated analyses for residual monomer demonstrated that substantially less than 0.1% by weight is present.

Since certain changes may be made in the above process without departing from the scope of the invention herein involved, it is intended that all matter contained in the above description shall be interpreted as illustrative and not in a limiting sense.

What is claimed is:

1. The process of polymerizing a substantially water-insoluble vinyl pyridine monomer selected from the group consisting of 2-vinyl pyridine and 4-vinyl pyridine in a polymerization system which comprises an aqueous solution of a polyvinyl alcohol suspending agent, said system containing from 78% to 85% by weight water, which comprises conducting said polymerization in the presence of a catalyst which is partially soluble in the aqueous phase of said system whereupon substantially all of the monomer dissolved in said aqueous phase is polymerized and less than 0.1% by weight of monomer remains in the system.

2. The invention of claim 1 wherein said catalyst is 2,2′-azobis[methyl propionitrile].

3. The invention of claim 2 wherein said vinyl pyridine monomer is 4-vinyl pyridine.

4. The invention of claim 3 wherein the ratio of polyvinyl alcohol suspending agent to 4-vinyl pyridine monomer is 2:1 by weight.

References Cited

UNITED STATES PATENTS 3,208,964 9/1965 Valle ............ 260—895

HARRY WONG, Jr., Primary Examiner

U.S. Cl. X.R.

96—29, 76; 117—145, 155; 260—29.6, 895